July 1, 1924.

W. H. LUTZ

SHEARS

Filed Oct. 15, 1923

W. H. Lutz
INVENTOR

BY Victor J. Evans
ATTORNEY

WITNESS:

Patented July 1, 1924.

1,500,024

UNITED STATES PATENT OFFICE.

WILLIAM H. LUTZ, OF SUGAR GROVE, OHIO.

SHEARS.

Application filed October 15, 1923. Serial No. 668,658.

*To all whom it may concern:*

Be it known that I, WILLIAM H. LUTZ, a citizen of the United States, residing at Sugar Grove, in the county of Fairfield and State of Ohio, have invented new and useful Improvements in Shears, of which the following is a specification.

This invention contemplates the provision of a pruning shears designed for the convenience of handling, and to permit of a maximum amount of work to be accomplished in a given time.

It is also the purpose of this invention to provide a pruning shears which can be used to cut a limb close to the tree, thus removing the limb without leaving any projections or rough surfaces, the general arrangement of the various parts of the shears affording the latter maximum strength and durability.

In carrying out the invention, I make use of a disk cutter carried by one of a pair of pivot handles, the disk cooperating with a hook like terminal formed on the other handle to make the shears very effective when in use, the disk being susceptible of adjustment so that a new cutting edge can be presented for use from time to time as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
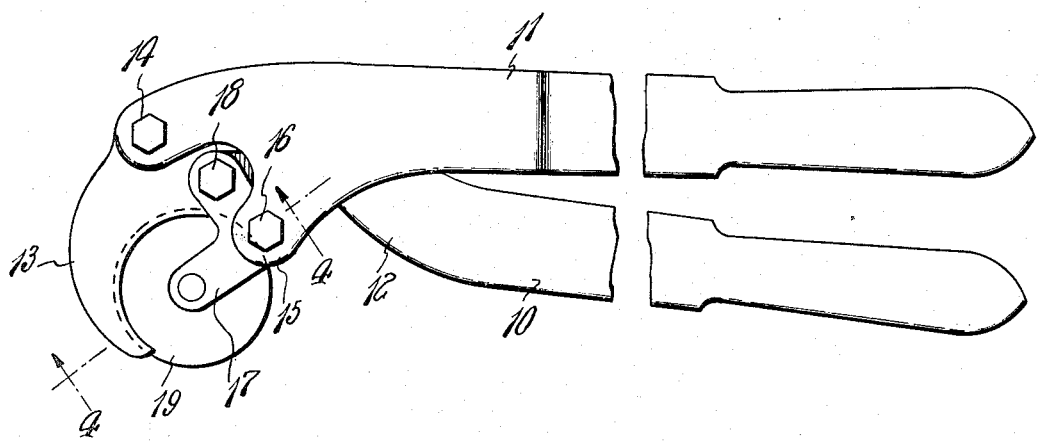
Figure 1 is a view in elevation of the shears closed.
Figure 3:
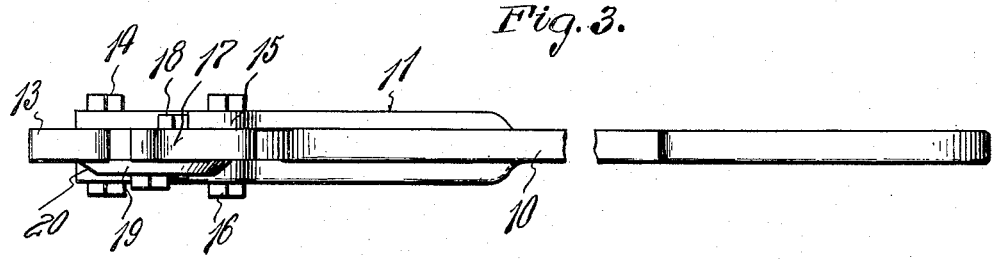
Figure 3 is an edge elevation taken at a right angle to Figure 1.
Figure 4:
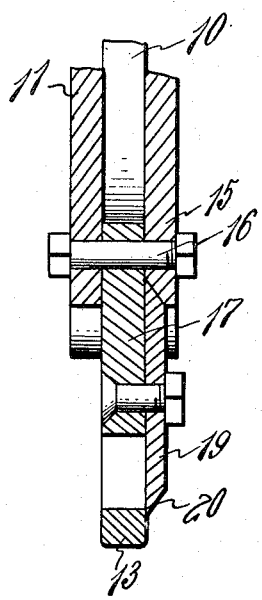
Figure 4 is a sectional view taken on the line 4—4 of Figure 1.
Figure 8:
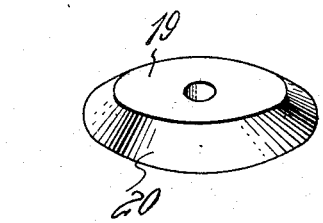
Figure 8 is a detailed view of the disk.
Figure 2:
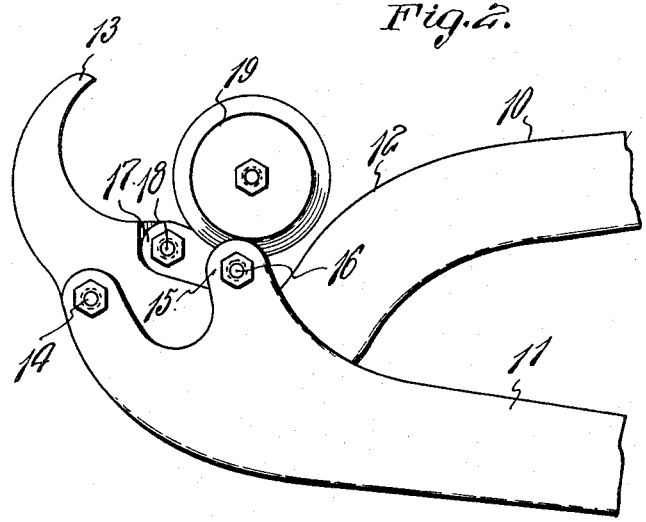
Figure 2 is a view looking from the opposite sides of the shears showing the latter opened.
Figure 5:
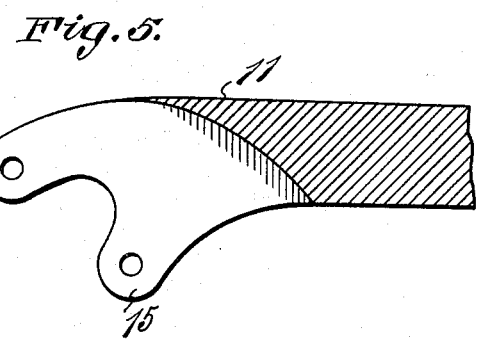
Figure 5 is a fragmentary view of one of the handles.
Figure 7:
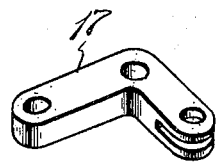
Figure 7 is a detailed view of the link which supports the cutting disk.
Figure 6:
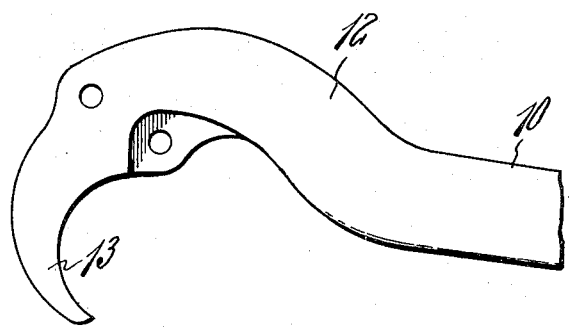
Figure 6 is a similar view of the other handle.

Referring to the drawings in detail, 10 and 11 represent the handles of the shears, the former being curved as at 12 and terminating to provide a hook like extermity 13, the latter being tapered toward its free end as shown. The handle 11 is bifurcated at one end to straddle the curved portion 12 of the handle 10, these handles being pivoted together by means of a pivot bolt 14, and immediately at the point of juncture of the curved portion 12 with the hook terminal 13. The handles are adapted to be moved toward and away from each other during the use of the shears, and are limited in their movements toward each other by contact between the curved portion 12 of the handle 10 and the shoulder formed on the handle 11 at the end of the bifurcation thereof. The handle 11 is formed to provide spaced apertured lugs 15 which project within the curved portion of the handle 10, to accomodate a pivot bolt 16 on which the link 17 is pivoted. It will be noted that this link is substantially V-shaped and is pivoted upon the bolt 16 at the apex thereof, one extremity of the link being pivoted as at 18 upon the handle 10, while the other end of the link supports the cutting disk 19. This disk is bevelled as at 20 to provide a sharp cutting edge, and when the shears are closed the adjacent edge of the hook like terminal 13 on the handle 10 passes inwardly beyond the cutting edge of the disk 19 making the shears more effective, in that a limb or the like can be quickly cut with a minimun of effort. The cutting disk 19 is fixed with relation to the link 17, but by loosening the nut on the pivot 20 therefor this disk can be partially rotated from time to time to present a new cutting edge as the occasion may require. As the disk has been thus turned one complete revolution, it can be replaced by a new disk, or can be sharpened for further use, and the disk can be very easily removed from the link 20 for either purpose. In view of the fact that the handle 11 straddles the handle 10, and that the link 17 is positioned between the apertured lugs 15, and that the disk 19 is received by the link 17, the parts are all held in practical align, and cannot be easily distorted or disarranged should the shears be subjected to rough usage or placed under any great amount of strain, incident to their use. They not only possess maximum strength and durability, but can be conveniently handled to accomplish a greater amount of work in a given time than any other pair of shears for the same purpose, with which I am familiar.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A pruning shears comprising a pair of pivotally connected handles, a hook like terminal on one handle, a link having pivotal connection with the last mentioned handle at a point adjacent said terminal and also with the other of said handle at a point adjacent their pivotal connection, and a cutting disk carried by said link and cooperating with said hook like terminal for the purpose specified.

2. A pruning shears comprising a pair of handles pivotally connected together for movement toward and away from each other, one of said handles being extended to provide a hook like terminal, apertured lugs projecting from the other handle and straddling the first mentioned handle, a link pivoted between said apertured lugs at a point between its ends, one end of said link being pivotally connected with the first mentioned handle adjacent the hook like terminal thereof, and a cutting disk carried by the other end of the link and cooperating with said hook like terminal for the purpose specified.

3. A pruning shears comprising a pair of handles, one of said handles being curved adjacent one end, and extended to provide a hook like terminal, the other of said handles being bifurcated to straddle the curved portion of the first mentioned handle, pivotally connected therewith, apertured lugs projecting from the second mentioned handle and projecting within the curved portion of the first mentioned handle, a link pivoted between said lugs, one end of said link being pivotally connected with the first mentioned handle adjacent the curved extremity thereof, and a cutting disk supported by the other end of said link, and susceptible of adjustment to present a new cutting edge from time to time, said disk cooperating with the hook like extremity of the first mentioned handle for the purpose specified.

In testimony whereof I affix my signature.

WILLIAM H. LUTZ.